United States Patent
Xydis

(10) Patent No.: US 6,307,471 B1
(45) Date of Patent: Oct. 23, 2001

(54) RADIO BASED PROXIMITY TOKEN WITH MULTIPLE ANTENNAS

(75) Inventor: Thomas D. Xydis, Ann Arbor, MI (US)

(73) Assignee: Ensure Technologies, Inc., Ann Arbor, MI (US)

( * ) Notice: Subject to any disclaimer, the term of this patent is extended or adjusted under 35 U.S.C. 154(b) by 0 days.

(21) Appl. No.: 09/715,686

(22) Filed: Nov. 17, 2000

Related U.S. Application Data

(60) Provisional application No. 60/168,406, filed on Dec. 1, 1999.

(51) Int. Cl.[7] .................................................. G08B 13/14
(52) U.S. Cl. ........................ 340/568.1; 340/539; 340/571
(58) Field of Search ................................ 340/539, 568.1, 340/571, 572.1, 572.7, 10.1, 10.31, 825.34, 825.31, 573.4

(56) References Cited

U.S. PATENT DOCUMENTS

| | | | |
|---|---|---|---|
| 5,821,854 | * 10/1998 | Dorinski et al. | 340/539 |
| 5,842,118 | * 11/1998 | Wood, Jr. | 455/101 |
| 5,903,225 | * 5/1999 | Schmitt et al. | 340/825.31 |
| 5,958,051 | 9/1999 | Renaud et al. | 713/200 |
| 5,969,681 | 10/1999 | O'Neill, Jr. | 343/700 |
| 6,002,370 | 12/1999 | McKinnon et al. | 343/700 |
| 6,078,297 | 6/2000 | Kormanyos | 343/786 |
| 6,088,450 | * 7/2000 | Davis et al. | 340/825.31 |

\* cited by examiner

*Primary Examiner*—Van T. Trieu
(74) *Attorney, Agent, or Firm*—Howard & Howard

(57) ABSTRACT

A method of detecting a signal (10, 10') between a token (12) and an electronic device (14) for authorizing a user (16) to access the electronic device (14). The method comprises the steps of emitting a signal (10, 10') containing data, detecting the signal (10, 10') with a plurality of antennas (18, 18'), and measuring the strength of the signal (10, 10') detected at each of the antennas (18, 18'). If the maximum signal strength detected by any of the antennas (18, 18') is above an operational threshold, the electronic device (14) will be enabled. If the signal (10, 10') is above the operational threshold, the signal (10, 10') is compared to a user code database for authorizing the user (16) to access the electronic device (14). The operational threshold may be lowered to account for any signal variances that may occur after the user (16) has been authorized to access or when accessing the electronic device (14).

18 Claims, 3 Drawing Sheets

RADIO BASED PROXIMITY TOKEN WITH MULTIPLE ANTENNAS

BACKGROUND OF THE INVENTION

This application claims priority to provisional patent application 60/168,406 which was filed Dec. 01, 1999.

FIELD OF THE INVENTION

A method of detecting a signal transmitted between a token and an electronic device for authorizing a user to access the electronic device

DESCRIPTION OF THE PRIOR ART

One method for providing security for accessing an electronic device includes detecting a signal between a token and an electronic device for authorizing a user to access the electronic device. The method comprises the steps of emitting a signal, detecting the signal with an antenna, and measuring the strength of the signal detected at the antenna. The signal is then compared to a predetermined threshold to determine if the user is within a predetermined range. If the user is determined to be within the predetermined range, the user is authorized to access the electronic device. If the strength of the signal is below the predetermined threshold, the user is not allowed to access the electronic device.

One such method is shown in U.S. Pat. No. 5,821,854 for providing security to a personal computer. However, the software used for this method frequently locks the computer in response to signal strength dropping below the predetermined threshold due to the user moving and working near the computer. If the predetermined threshold is lowered to allow the user more mobility, the computer is less secure because the signal strength may still be above the predetermined threshold to allow an unauthorized user to access the computer when the user is not in proximity to the computer.

SUMMARY OF THE INVENTION AND ADVANTAGES

The subject invention provides a method of detecting a signal between a token, i.e. a badge, and an electronic device for authorizing a user to access the electronic device. The method comprises the steps of emitting a signal containing data, detecting the signal with a plurality of antennas, and measuring the strength of the signal detected at each of the plurality of antennas. The method is characterized by sensing the maximum signal strength detected at any of the plurality of antennas and enabling the electronic device in response to the maximum signal strength being above an operational threshold.

Accordingly, the subject invention provides additional security when detecting a signal between a token and an electronic device for providing access to a user. The plurality of antennas allows for detection of the maximum signal strength to overcome any variance that may be detected by the user moving or working near the electronic device. Additionally, the detection of the multiple signals allows the electronic device to log all detected signals and to determine the location of the user relative to the electronic device. The method further provides additional security to prevent the electronic device from being accessed by an unauthorized user when the user is not in proximity to the electronic device.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
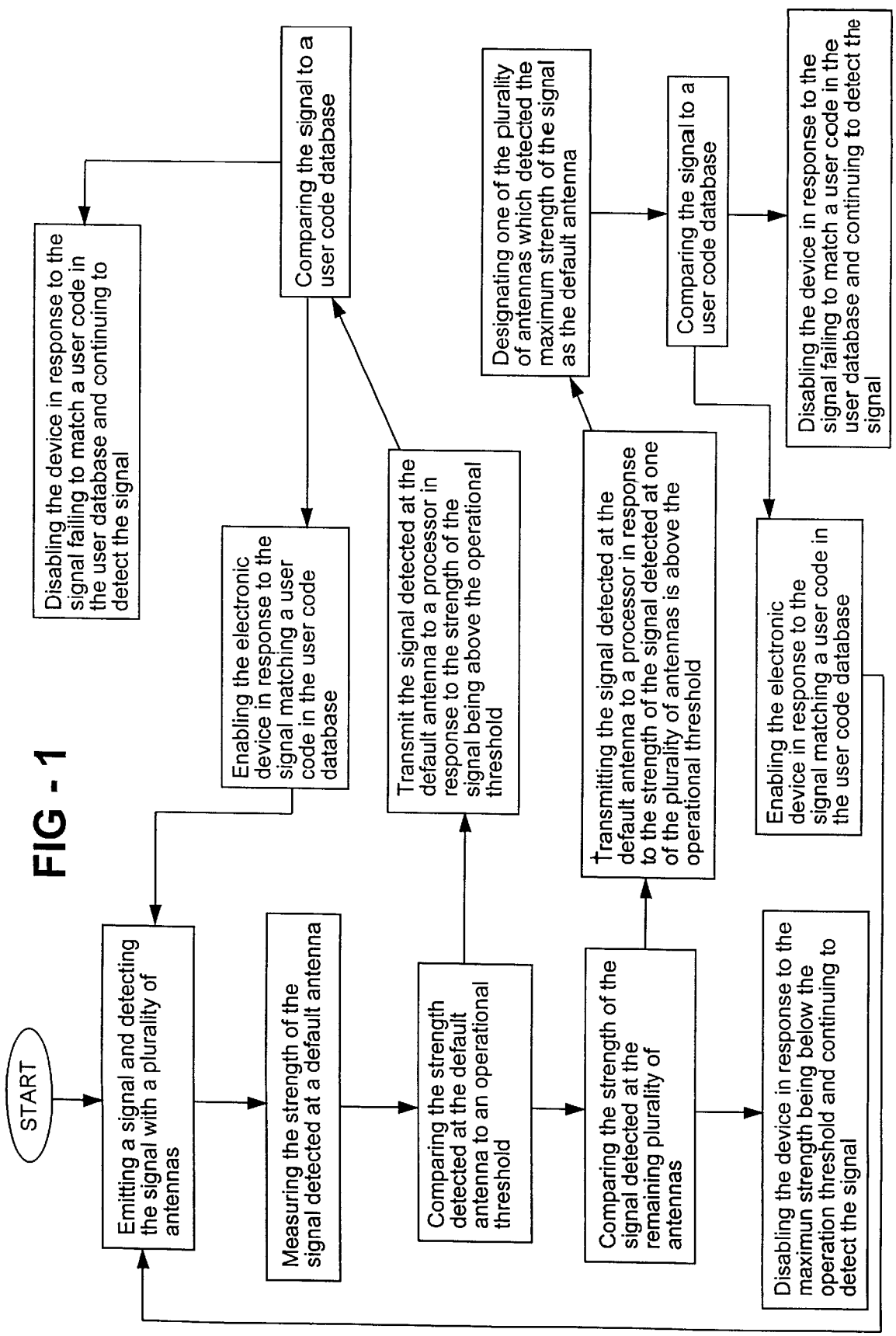
FIG. 1 is a flowchart showing a method of detecting a signal to authorize a user to access an electronic device.

Referring to the Figures, wherein like numerals indicate like or corresponding parts throughout the several views, a flowchart illustrating a method of detecting a signal 10, 10' between a token 12, i.e. a badge having a transceiver disposed therein, and an electronic device 14 for authorizing a user 16 to access the electronic device 14 is shown in FIG. 1.

Figure 2:
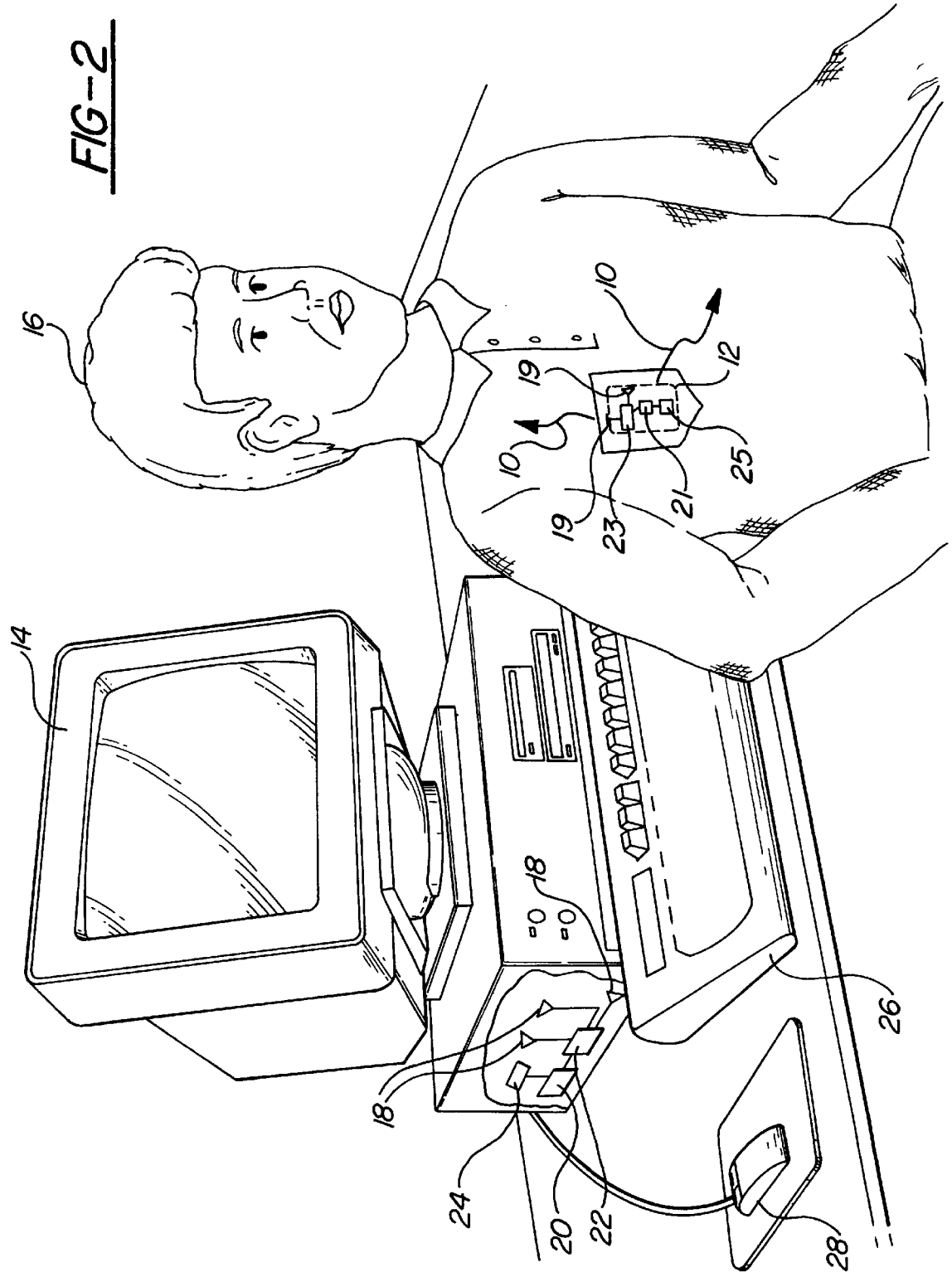
FIG. 2 is a perspective view of a first embodiment of a user wearing a token facing away from an electronic device such that the strength of the signal is below a predetermined threshold.

The method comprises the steps of emitting the signal 10, 10' containing data, detecting the 10, 10' with a first plurality of antennas 18, 18', and measuring the strength of the signal 10, 10' detected at each of the first plurality of antennas 18, 18'. The signal 10, 10' is preferably emitted as a radio frequency (RF) or an equivalent signal that allows for wireless communication as is known in the art. A first embodiment, as shown in FIG. 2, emits the signal 10 from the token 12. The second embodiment, shown in FIG. 3, emits the signal 10' from the electronic device 14. The signal 10, 10' maybe emitted continuously or periodically as is required to provide adequate security and to authorize the user 16 for continued access to the electronic device 14. The token 12 may be programmed to transmit for a specified period of time and then terminate transmission for a predetermined period of time. The token 12 may be a badge, a pager, or any other portable unit carried or worn by the user 16.

Figure 3:
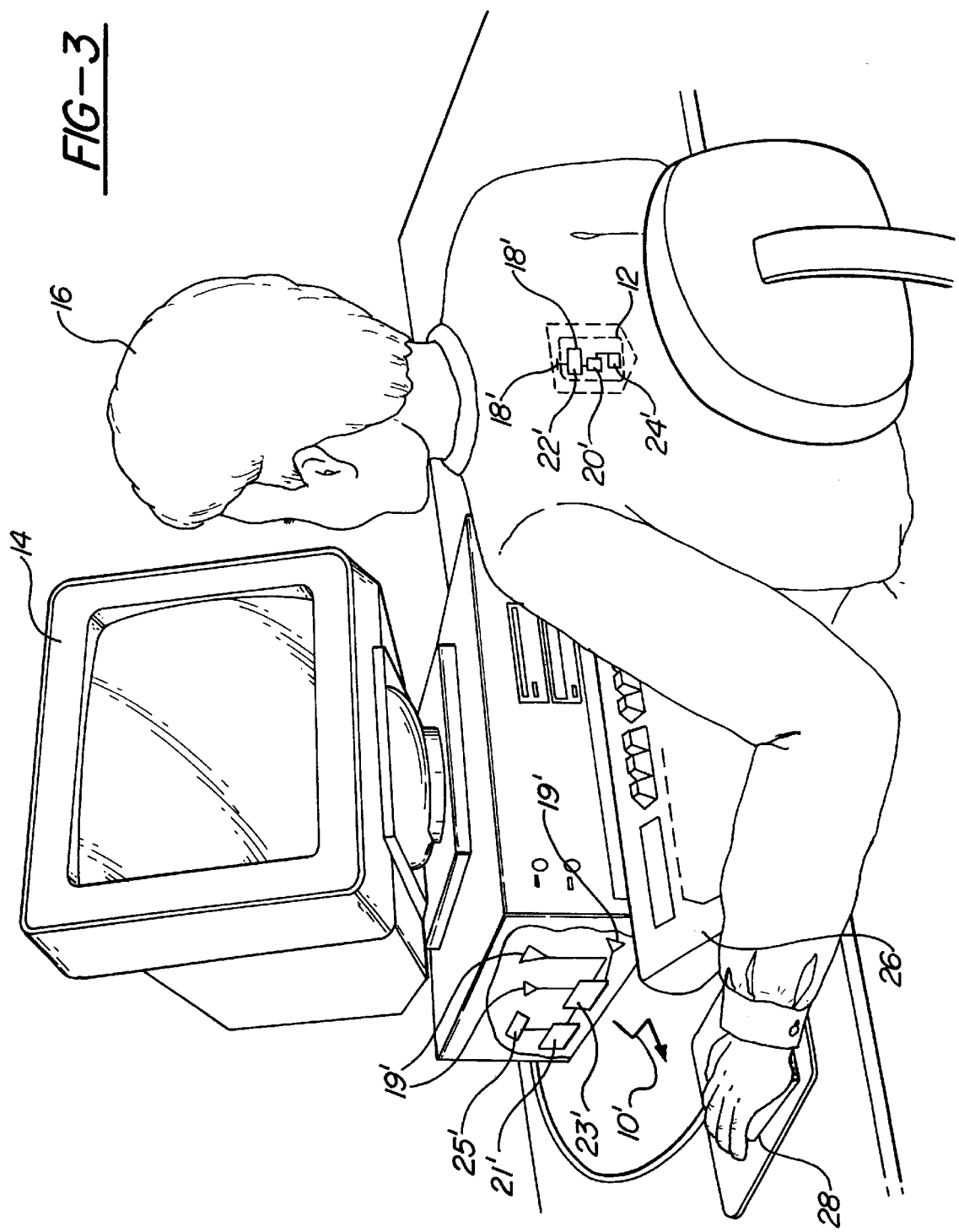
FIG. 3 is a perspective view of a second embodiment of the user wearing the token and operating the electronic device whereby the signal is being detected and the user is authorized to access the electronic device.

In FIG. 2, the token 12 has a second plurality of antennas 19 positioned transverse to each other for subsequently emitting the signal 10 from one of the antennas 19 and then from the other of the antennas 19. In FIG. 3, the electronic device 14 has the second plurality of antennas 19' positioned parallel and transverse to each other for subsequently emitting the signal 10' from one of the antennas 19' and then from the other of the antennas 19'.

In both embodiments, the first plurality of antennas 18, 18' are aimed transversely to each other such that one of the antennas 18, 18' is aimed in a first direction and the other of the antennas 18, 18' is aimed in a second direction so that one of the directions is always more sensitive for detecting the signal 10, 10', that is, except when the signal direction bisects the antennas 18, 18'. The electronic device 14 is preferably a computer but may further include printers, cellular phones, scanners, or any other electronic equipment. The emitted signal 10, 10' is detected by the plurality of antennas 18, 18'. The antennas 18, 18' may be any type of antennas as is known in the art of RF signal detection. In addition, the antennas 18, 18' maybe circularly polarized for increasing the probability of detecting the other of the antennas 19'.

In the first embodiment, shown in FIG. 2, the electronic device 14 has a first measurement device 20, an first antenna switch 22 and a first processor 24 and the token 12 has an second antenna switch 23, a second measurement device 21 and a second processor 25 to perform the method as described below. In the second embodiment, shown in FIG. 3, the token 12 has the first measurement device 20', the first antenna switch 22', and the first processor 24' and the electronic device 14 has the second measurement device 211, the second antenna switch 23', and the second processor 25' to perform the method as described below. It is to be understood that the method may be practiced with one way or two way communication between the token 12 and the electronic device 14.

After the signal 10, 10' has been detected by the antennas 18, 18', the signal 10, 10' is sent to a measurement device 20, 20' for measuring the strength of the signal 10, 10' detected. Most likely, each of the antennas 18, 18' will detect a different signal strength. An antenna switch 22, 22' alternates which of the antennas 18, 18' are being measured for detecting the strength of the signal 10, 10' to verify that at least one of the antennas 18, 18' are receiving a signal strength above an operational threshold.

The method is characterized by sensing the maximum signal strength of the signal 10, 10' detected by any of the plurality of antennas 18, 18' and disabling the electronic device 14 in response to the maximum signal strength falling below the operational threshold. One of the antennas 18, 18' that senses the maximum signal strength is designated as a default antenna. The antenna switch 22, 22' is initially positioned at the default antenna The antennas 18, 18' are continuously scanned by the antenna switch 22, 22' for detection of the signal 10, 10' for measuring the strength of the signal 10, 10' and to verify that at least one of the antennas 18, 18' are sensing a signal strength above the operational threshold. As the maximum signal strength is detected at a different antenna than the default antenna, the antenna switch selects the antenna as the new default antenna.

After the maximum signal strength has been sensed, the strength is compared to the operational threshold. If the signal 10, 10' detected at any of antennas 18, 18' is above the operational threshold, the signal 10, 10' detected at the default antenna is transmitted to a processor 24, 24'. For example, a signal is detected at a first, default antenna and a second antenna. The signal strength is measured at the first antenna and the second antenna and the signal strength at the first antenna is compared to the operational threshold. If the signal strength at the first antenna is above the threshold, then the signal detected at the first antenna is transmitted to the processor 24, 24' and the first antenna remains the default antenna. If the signal strength at the first antenna is below the operational threshold, then the signal strength at the second antenna is compared to the operational threshold. If the signal strength at the second antenna is above the operational threshold, the signal detected at the first antenna is sent to the processor 24, 24' and the second antenna becomes the default antenna. Even if the signal strength at the first antenna is above the operational threshold, the signal strength at the second antenna will be transmitted to the processor 24, 24' for establishing the default antenna for subsequent detection. If the signal strength at the second antenna is stronger than that detected at the first antenna, then the second antenna becomes the default antenna. When the signal strength measured at every antennas 18, 18' falls below the operational threshold, the electronic device 14 is disabled.

The processor 24, 24' compares data of the signal 10, 10' to a user code database. If the data of the signal 10, 10' matches a user code in the user code database, the electronic device 14 is enabled and the user 16 is authorized to access the electronic device 14. If the signal 10, 10'fails to match the user code, the electronic device 14 is disabled and the user 16 is unable to access the electronic device 14. If the maximum signal strength detected at one of the antennas 18, 18' is below the operational threshold, the electronic device 14 remains disabled and the user 16 is unable to access the electronic device 14. The antennas 18, 18' continuously detect signals from a plurality of tokens that are within range of the electronic device 14.

The processor 24, 24' receives signal information for each of the tokens 12 including which one of the first plurality of antennas 18, 18' which detected the signal 10, 10', the one of the second plurality of antennas 19, 19' which emitted the signal 10, 10', the signal strength detected at the first antenna 18, 18', and the signal strength detected at the second antenna 18, 18'. For example, if the signal strength detected by any of the antennas 18, 18' is above the operational threshold for a plurality of user 16 each having the token 12, each of the users will be authorized to access the electronic device 14. If more than one user 16 is authorized to operate the electronic device 14, the electronic device 14 can only be operated by the first user 16 who identified himself by way of logging into the computer. This is accomplished by password entry, biometrics, or any other method as is known in the art of verifying a users identity. If only one user 16 is authorized to use the electronic device 14 and that user 16 then identifies himself to the electronic device 14, the electronic device 14 can only be accessed by that user 16. Meanwhile, the plurality of antennas 18, 18' are still detecting each of the user signals, but the processor 24, 24', will not respond to the signal. Once the user 16 logs out of the electronic device 14 or his signal strength falls below the operational threshold, the processor 24, 24' will then respond to the detection of the other users signals. The processor 24, 24' examines the signal information and determines if any of the users signals are not detected. The processor 24, 24' also maintains a log of the signal information for determining what tokens 12 are in the operating space and when the signal 10, 10' is not detected.

As the user 16 moves about the electronic device 14, the strength of the signal 10, 10' can vary with the position and direction the user 16 is facing. The strength of the signal 10, 10' is lower when the user 16 faces away from the electronic device 14, as shown in FIG. 2, or when the signal 10, 10' is being blocked by the user 16 or any other object. Therefore, the operational threshold may be changed to account for such variances in the signal strength after the user 16 has been authorized or when accessing the electronic device 14. The changes to the operational threshold are determined by the level of security and are preprogrammed into the processor 24, 24'. For instance, the operational threshold may be lowered in response to the signal 10, 10' matching a user code in the user code database when the maximum signal strength detected is above the operational threshold. The operational threshold may also be changed when the user 16 operates a peripheral component connected to the electronic device 14. In one embodiment, the operational threshold may be lowered for a computer when the user 16 manipulates a keyboard 26 or a mouse 28.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of detecting a signal between a token and an electronic device for authorizing a user to access the electronic device, said method comprising the steps of;

emitting a signal (10, 10') containing data from at least one of a token (12) and an electronic device (14), detecting the same signal (10, 10') with each of a first plurality of antennas (18, 18') disposed within the other of the token (12) and the electronic device (14), measuring the strength of the same signal (10, 10') detected at each of the first plurality of antennas (18, 18') with a measurement device (20, 20'), sensing the maximum signal strength detected by any of the first plurality of antennas (18, 18'), and enabling the electronic device (14) to allow the user access in response to the maximum signal strength being above an operational threshold to overcome variances in signal strength in response to relative movement between the token (12) and the electronic device (14) to remain enabled so long as at least one antenna (18, 18') detects the same signal (10, 10') and measures the maximum signal strength above the operational threshold.

2. A method as set forth in claim 1 wherein the measuring is further characterized by scanning the first plurality of antennas (18, 18') for sequentially measuring the strength of the signal (10, 10') at each antenna and isolating the antenna measuring the maximum signal strength as a default antenna such that the default antenna is the first one of the plurality of antennas (18, 18') to detect the signal (10, 10') upon subsequent emissions.

3. A method as set forth in claim 2 further characterized by comparing the data of the signal (10, 10') detected at the default antenna to a user code database and enabling the electronic device (14) for authorizing a user (16) to access the electronic device (14).

4. A method as set forth in claim 3 further characterized by changing the operational threshold in response to the data of the signal (10, 10') matching a user code in the user code database.

5. A method as set forth in claim 4 further characterized by changing the operational threshold in response to operation of the electronic device (14) by the user (16).

6. A method as set forth in claim 4 wherein the changing of the operational threshold is further defined by lowering the operational threshold.

7. A method as set forth in claim 6 wherein the changing of the operational threshold is further defined as lowering the threshold in response to input to the computer from one of a keyboard (26) and a mouse (28).

8. A method as set forth in claim 2 further defined as emitting the signal (10, 10') from the electronic device (14) and measuring the strength of the signal and sensing the maximum signal strength by a token (12).

9. A method as set forth in claim 2 further defined as emitting the signal (10, 10') from the token (12) and measuring the strength of the signal and sensing the maximum signal strength by the electronic device (14).

10. A method as set forth in claim 2 further characterized by aiming one of the first plurality of antennas (18, 18') in a first direction and an other of the first plurality of antennas (18, 18') in a second direction, the first direction being transverse to the second direction and such that one of either the first direction and the second direction is more sensitive for detecting the signal (10, 10') than the other direction.

11. A method as set forth in claim 2 wherein the emitting of the signal (10, 10') is further defined as emitting the signal (10, 10') from a second plurality of antennas (19, 19').

12. A method as set forth in claim 11 wherein the emitting of the signal (10, 10') from the second plurality of antennas (19, 19') is further defined as alternating the emission of the signal (10, 10') from one of the second plurality of antennas (19, 19') and then from the other of the second plurality of antennas (19, 19').

13. A method as set forth in claim 12 including sequentially detecting each of the signals (10, 10') emitted from the second plurality of antennas (19, 19') and measuring the strength of the sequential signals (10, 10') with the first plurality of antennas (18, 18').

14. A method of detecting a signal between a token and an electronic device for authorizing a user to access the electronic device, said method comprising the steps of;

emitting a signal (10, 10'), detecting the signal (10, 10') with at least one antenna, measuring the strength of the signal (10, 10') detected by the antenna, comparing the strength of the signal (10, 10') to an operational threshold, enabling the electronic device (14) to allow the user access in response to the signal strength being above the operational threshold, changing the operational threshold in response to the user (16) manipulating the electronic device (14) such that variances in the signal strength allow the electronic device (14) to remain enabled so long as the user is using the electronic device (14), restoring the operational threshold to the prior value before changing when the user ceases using the electronic device (14).

15. A method as set forth in claim 14 wherein the changing of the operational threshold is further defined by lowering the operational threshold.

16. A method as set forth in claim 15 wherein the enabling of the electronic device (14) is further defined as enabling a computer.

17. A method as set forth in claim 16 wherein the changing of the operational threshold is further defined as lowering the threshold in response to input to the computer from one of a keyboard (26) and a mouse (28).

18. A method as set forth in claim 14 wherein the detecting of the signal (10, 10') includes detecting the signal (10, 10') with a plurality of antennas (18, 18').

* * * * *